(12) United States Patent
Baugh et al.

(10) Patent No.: US 6,619,696 B2
(45) Date of Patent: Sep. 16, 2003

(54) EXPANDABLE LOCKING THREAD JOINT

(75) Inventors: John L. Baugh, Houston, TX (US); Michael Carmody, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/010,866

(22) Filed: Dec. 6, 2001

(65) Prior Publication Data

US 2003/0107213 A1 Jun. 12, 2003

(51) Int. Cl.⁷ .................................................. F16L 15/04
(52) U.S. Cl. ........................ 285/92; 285/333; 285/355; 285/390; 285/382; 285/382.4; 285/81
(58) Field of Search ........................ 285/92, 333, 334, 285/3, 81, 355, 390, 148.6, 382, 382.5, 382.4; 29/506, 507

(56) References Cited

U.S. PATENT DOCUMENTS

| | | | | |
|---|---|---|---|---|
| 331,940 A | * | 12/1885 | Bole | 29/890.14 |
| 332,184 A | * | 12/1885 | Bole | 285/382.4 |
| 2,160,263 A | * | 5/1939 | Fletcher | 285/115 |
| 5,044,676 A | * | 9/1991 | Burton et al. | 285/334 |
| 5,785,357 A | * | 7/1998 | Foster et al. | 285/92 |

\* cited by examiner

*Primary Examiner*—Lynne R. Browne
*Assistant Examiner*—Giovanna M. Collins
(74) *Attorney, Agent, or Firm*—Steve Rosenblatt

(57) ABSTRACT

A thread for expandable downhole tubular connections is disclosed. It features a locking pattern on the pin and box, which engages upon expansion of the connection. The locking pattern compensates for longitudinal shrinkage away from a torque shoulder, as a result of expansion. A resilient seal can be incorporated into the design with pin to box clearance disappearing around the seal as a result of expansion. Resilient seals can be used in tandem to trap atmospheric pressure between them. The wellbore hydrostatic pressure helps engage the locking feature by pushing the box into the pin, helped by the trapped low pressure between the seals.

20 Claims, 5 Drawing Sheets

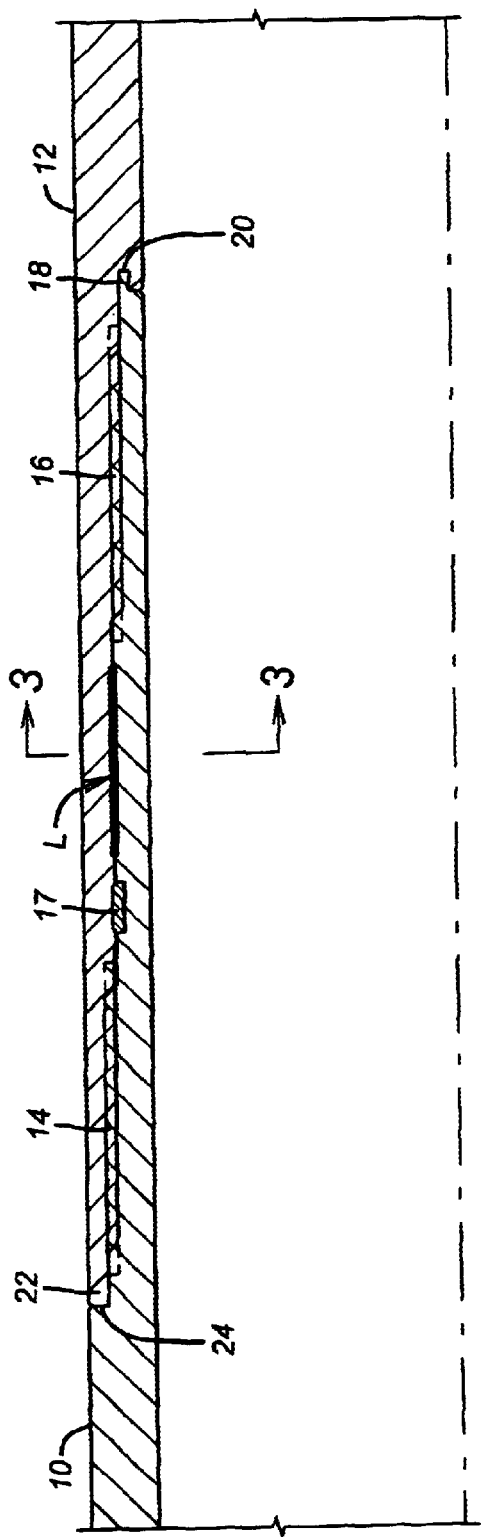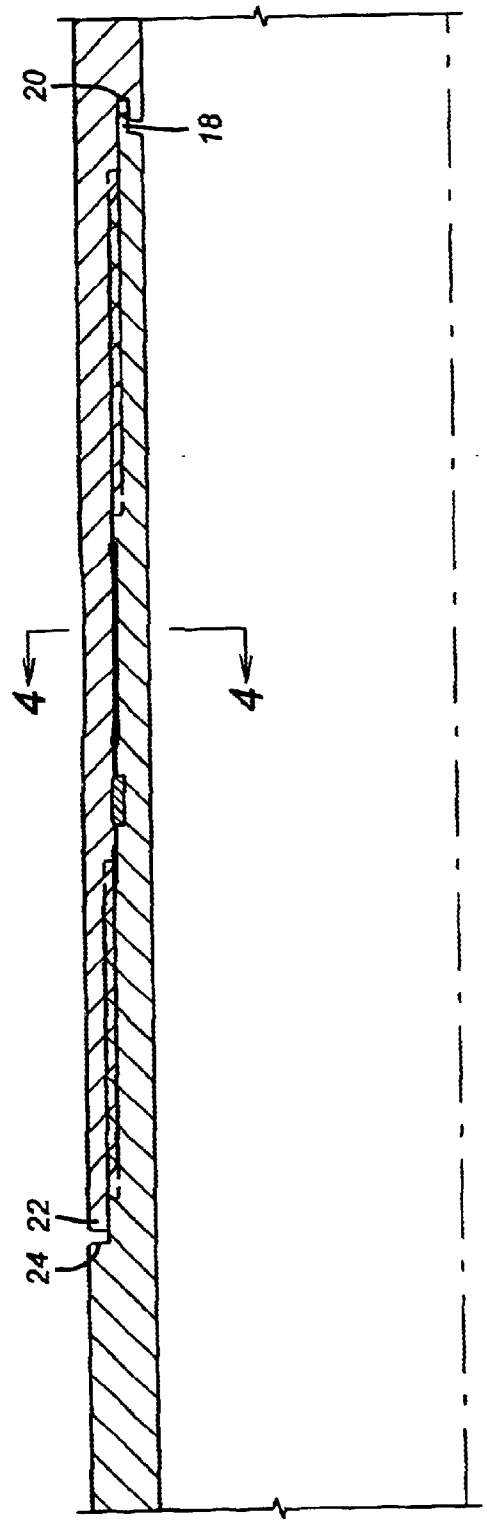

EXPANDABLE LOCKING THREAD JOINT

FIELD OF THE INVENTION

The field of the invention is tubular connections, which are expanded downhole, and more particularly threads that retain makeup torque despite longitudinal shrinkage resulting from expansion downhole.

BACKGROUND OF THE INVENTION

Oilfield tubular joints comprise a threaded pin and box which are made up against one or more torque shoulders with a force than can exceed 3000 foot pounds. Some designs further incorporate a resilient seal. One of the problems with such seals is that they fail because of a residual clearance in the seal area between the pin and the box, after makeup. When such joints are used downhole and expanded, longitudinal shrinkage at the pin end results in a pulling away of the pin end from the torque shoulder on the box. This allows very low torque levels to undo the connection with values as low as 200 foot-pounds or less. This longitudinal shrinkage can also eliminate the metal-to-metal seal, which existed after makeup and before expansion.

The present invention seeks to overcome, or at least alleviate, these shortcomings of the prior designs. It provides for a locking feature that retains the makeup torque and that is energized due to the expansion. It reduces or eliminates clearance around resilient seals due to the expansion. It also seeks to enhance the locking feature using spaced seals, which can trap atmospheric pressure between them, such that upon insertion downhole, hydrostatic pressure can push the box into the pin to better engage a locking feature. These and other advantages of the present invention can be more readily appreciated by a review of the detailed description of the preferred embodiment, which appears below.

SUMMARY OF THE INVENTION

A thread for expandable downhole tubular connections is disclosed. It features a locking pattern on the pin and box, which engages upon expansion of the connection. The locking pattern compensates for longitudinal shrinkage away from a torque shoulder, as a result of expansion. A resilient seal can be incorporated into the design with pin to box clearance disappearing around the seal as a result of expansion. Resilient seals can be used in tandem to trap atmospheric pressure between them. The wellbore hydrostatic pressure helps engage the locking feature by pushing the box into the pin, helped by the trapped low pressure between the seals.

BRIEF DESCRIPTION OF THE DRAWINGS

FIG. 1 is an elevation in section of the connection after makeup and before expansion;

FIG. 2 is the view of FIG. 1 after expansion;

DETAILED DESCRIPTION OF THE PREFERRED EMBODIMENT

Figure 3:
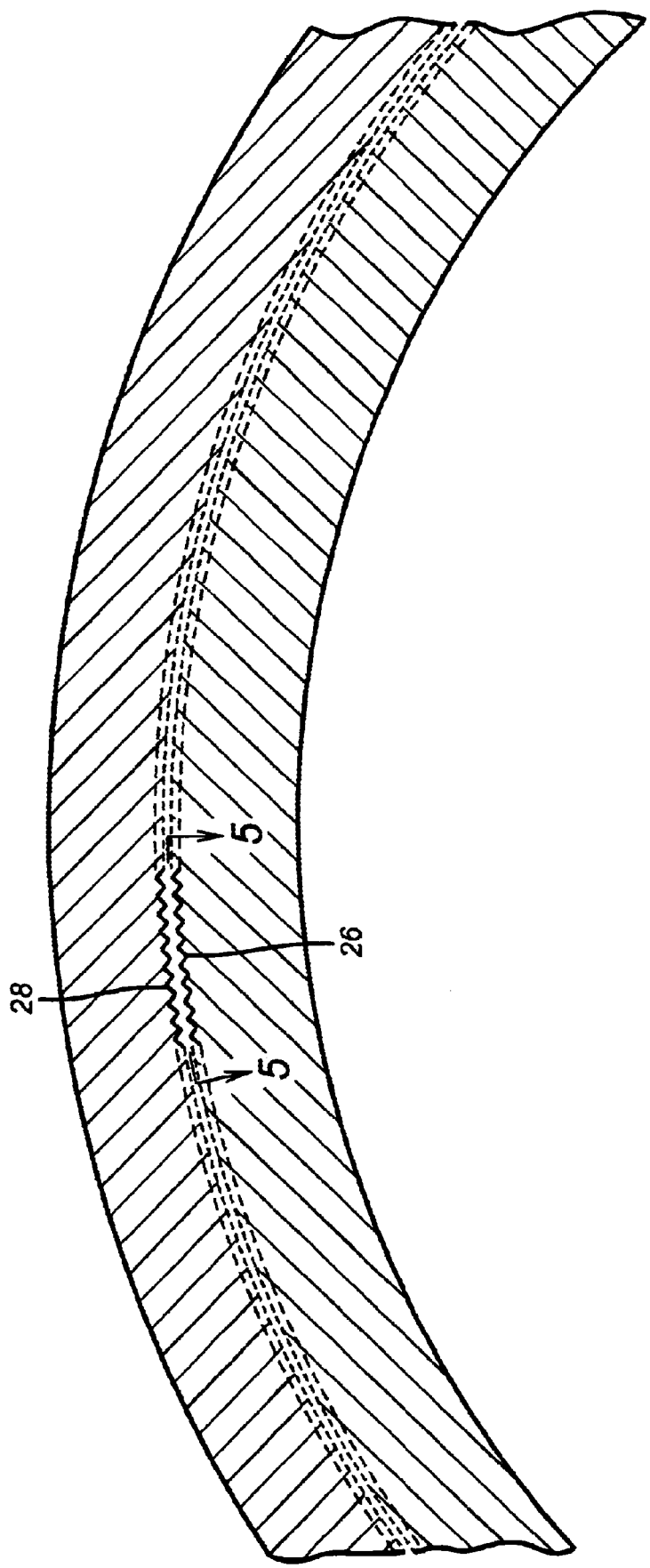
FIG. 3 is a section along line 3—3 of FIG. 1.

Referring to FIG. 1, the connection comprises a pin 10 threaded into a box 12. A two-step thread is illustrated comprising thread pairs 14 and 16, which are spaced apart to allow the placement of a resilient seal 17 and the locking feature L in between. Upon makeup, the pin end 18 is against a torque shoulder 20 on the box 12. The box end 22 is against a torque shoulder on the on the pin end 24. While a two-step thread is illustrated, a single or multi-step thread or other ways to connect the pin 10 to the box 12 are within the scope of the invention. For example, the connection could be a bayonet type involving pushing the pin 10 into the box 12 and relatively rotating them into a made up position, prior to expansion downhole. A wide variety of thread forms can also be used in the connection of the present invention. The locking feature L can be used alone, without the resilient seal 17. One or more resilient seals 17 can be used, with or without the locking feature L. These combinations and their benefits will be described in more detail below.

As seen in FIG. 1, when the joint is made up the pin and box ends are against their respective torque shoulders to hold the applied torque to the joint on makeup. However, upon expansion, as shown in FIG. 2, the pin end 18 has reduced in length and pulled away from its corresponding torque shoulder 20. Similarly, the box end 22 has pulled away from its corresponding torque shoulder 24. To prevent very low applied torques from undoing the joint after downhole expansion, the locking feature L, engages as a result of the expansion. It should be noted that the downhole expansion could be accomplished in a variety of ways, as contemplated in the present invention. A swage, applied pressure, or an inflatable are but three of the various ways contemplated to carry out the downhole expansinon.

Figure 4:
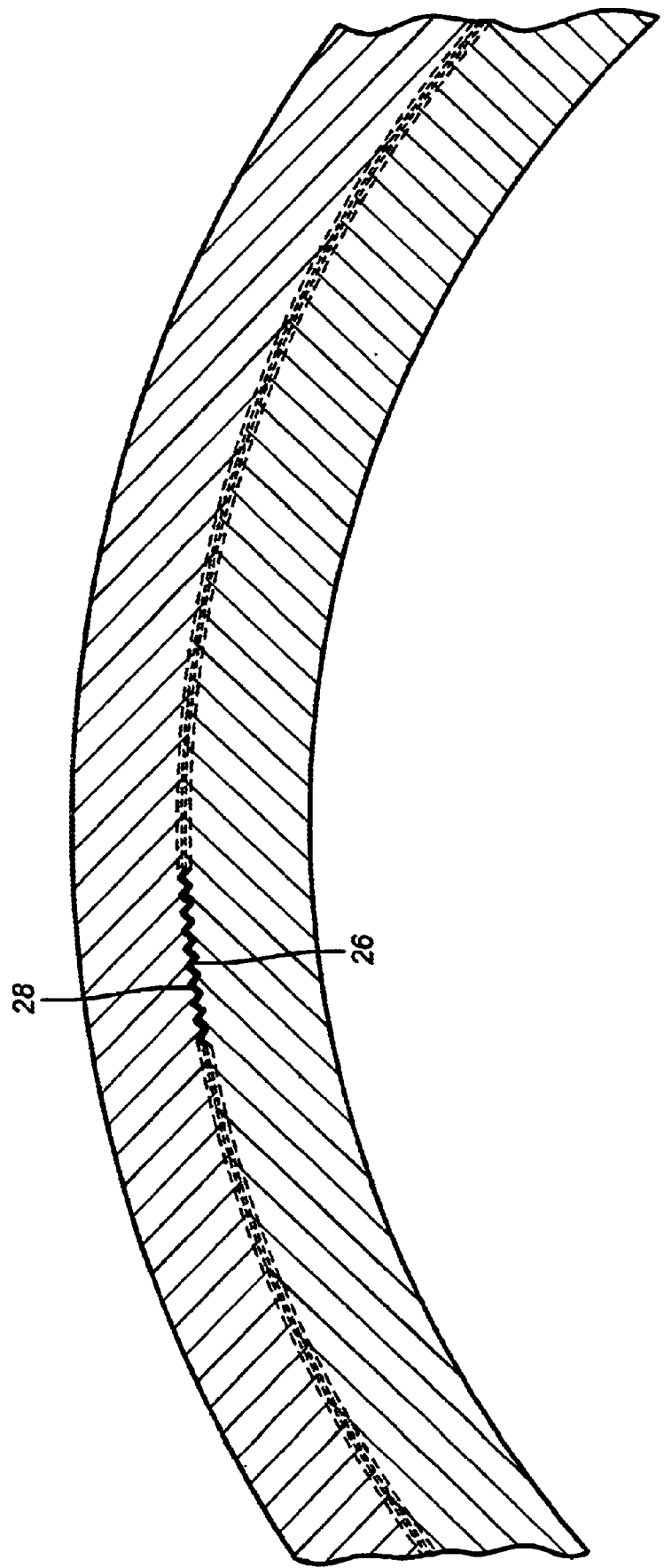
FIG. 4 is a section along line 4—4 of FIG. 2.
Figure 5:
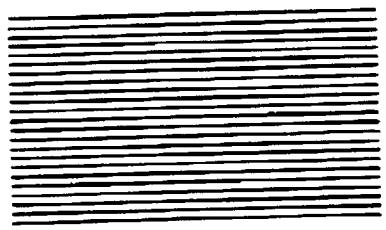
FIG. 5 is the view along line 5—5 of FIG. 3.
Figure 6:
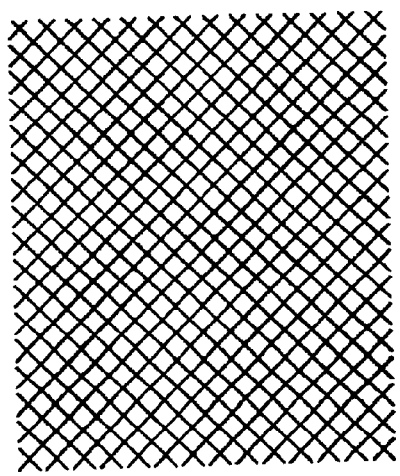
FIG. 6 is an alternative design to the locking profile shown in FIG. 5.
Figure 9:
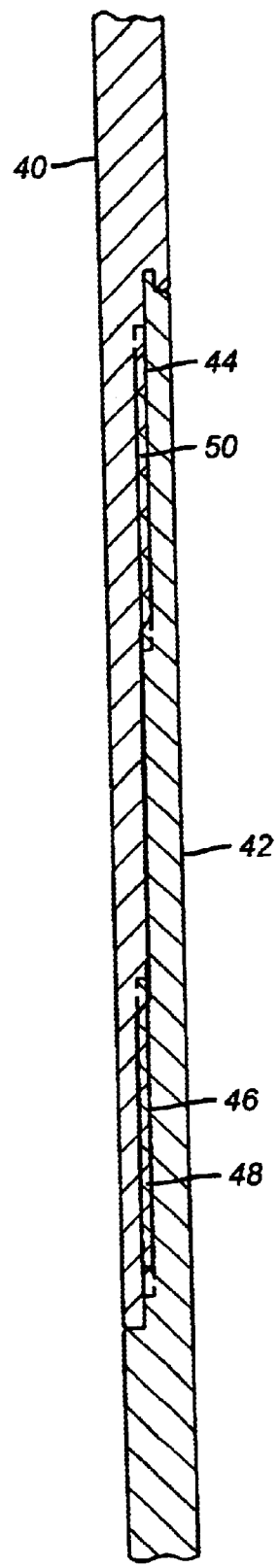

As a result of the expansion downhole, surfaces 26 and 28, which had been apart after makeup and before expansion as shown in FIG. 3, move into intimate contact, as shown in FIG. 4. Surface 26 is disposed on the pin 10 and surface 28 is on the box 12. These surfaces face each other and can be continuous or discontinuous. FIG. 5 shows a pattern of parallel ridges as one of the surface treatments for these surfaces and FIG. 6 shows an alternative diamond pattern. The parallel ridges are preferably oriented in alignment with the longitudinal axis of the joint. The invention contemplates a wide variation of surface treatments for surfaces 26 and 28, with the desired objective being that the joint is locked together after expansion as these surfaces engage. These surfaces do not need to have identical patterns that engage. Additionally only one surface can have a surface treatment and can engage the opposing cylindrical surface, which has no surface treatment. The surface treatment can be created in a variety of ways by either removing material from the surface or adding material to it. The surface treatment can be in an ordered pattern or a random array of projections and associated depressions. The overlap between the surface treatment on surfaces 26 and 28 can be total or partial. The projections can have a variety of configurations and dimensions. The limiting factor is that projections from surfaces 26 and 28 should not contact each other when the joint is made up. The locking aspect arises from inter-engagement, which occurs after the expansion downhole.

Figure 7:
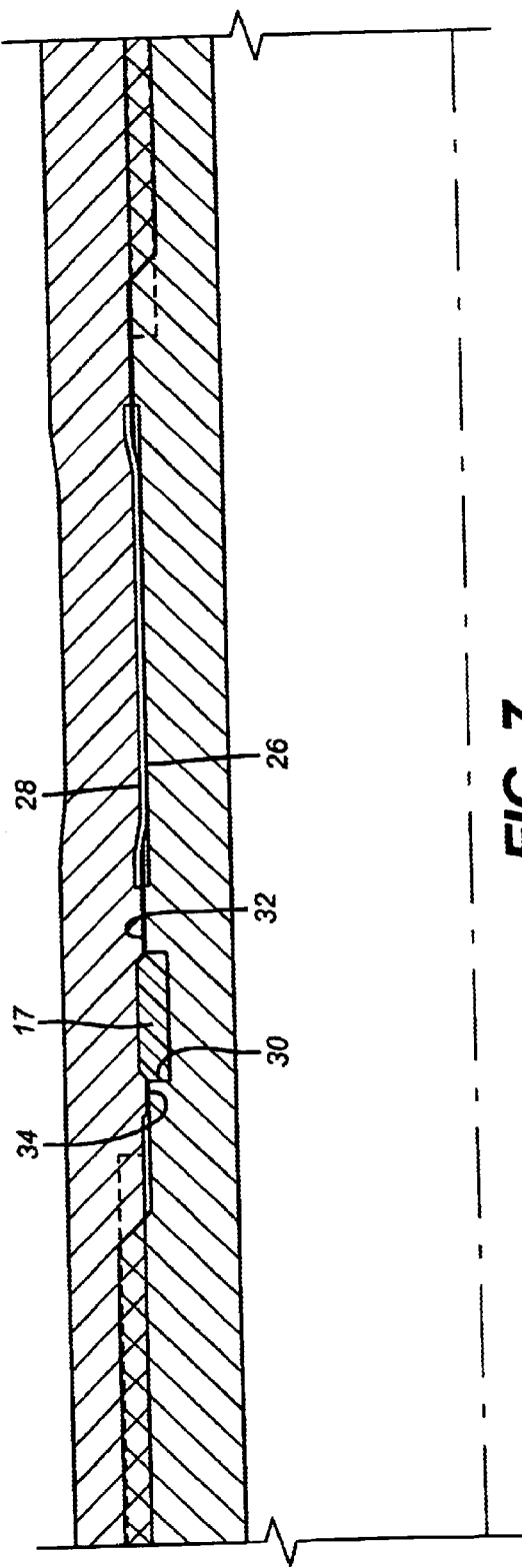
FIG. 7 is a more detailed view of FIG. 2.

FIG. 4 illustrates in more detail the engaged surfaces 26 and 28 of the locking feature L. It also illustrates the combination of the locking feature L with a single resilient seal 17. Seal 17 is disposed in a groove 30 in surface 32. Seal 17 extends beyond surface 32 into contact with surface 34 as the joint is torqued up at the surface. After makeup, surfaces 32 and 34 are spaced apart, as would be necessary to allow the joint to be made up. However, after expansion surfaces 32 and 34 are in contact with preferably zero clearance. The contact may be tight enough to form a metal-to-metal seal between these surfaces, above or/and below seal 17. In any event, the clearance is preferably eliminated taking away a common failure mode of resilient seals such as 17. The seal 17 may be in the middle of the thread, as shown if FIG. 7, or in any position with respect to the thread, as contemplated by the invention. Similarly, the locking feature L can be in any position with respect to the thread and not only between steps of a two-step thread, as shown in FIG. 7. The locking feature can be above or below the thread and the thread can be in a variety of configurations including but not limited to multi-step threads.

Figure 8:
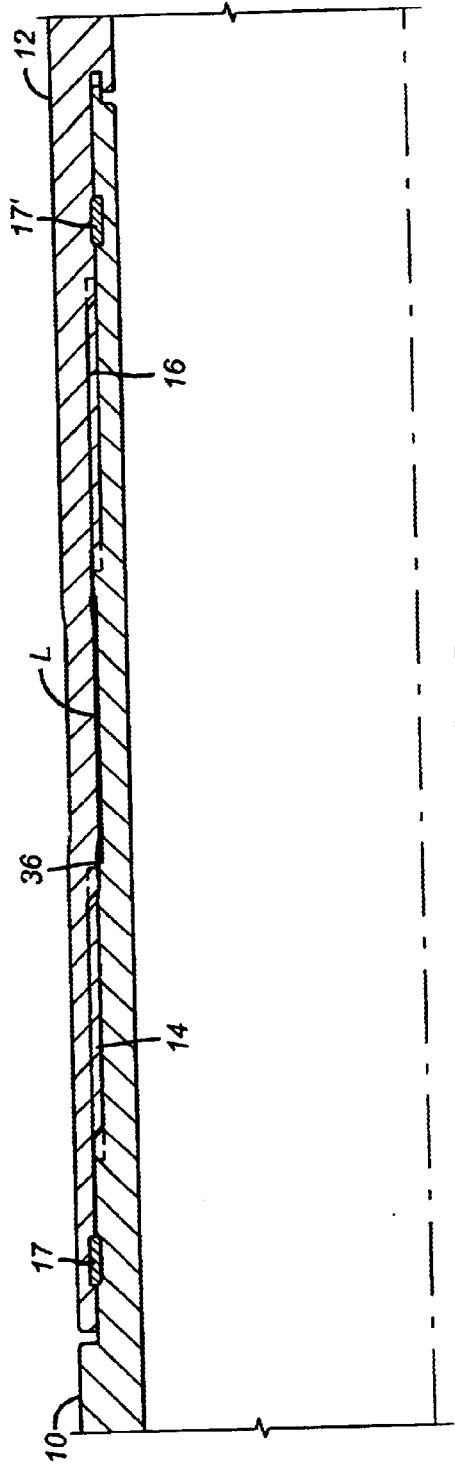
FIG. 8 is an alternative embodiment showing a pair of resilient seals.

FIG. 8 illustrates the use of at least two resilient or other type of seals 17 and 17'. In this embodiment, seals 17 and 17' are above and below the thread pairs 14 and 16 creating a trapped annular volume 36 between the pin 10 and the box 12 when the joint is made up at the surface. The locking feature L is shown disposed between the thread pairs 14 and 16. When the joint goes downhole, hydrostatic pressures act on the outside of the box 12 pushing it toward the pin 10 because the pressure in the annular volume 36 is still only atmospheric. The result is a reduction of volume of annular volume 36 to the point where the residual pressure can be sufficient to engage the surfaces 26 and 28 of the locking feature L even before downhole expansion. It should be noted that the use of multiple seals to create a trapped volume at atmospheric pressure between the pin and the box, could be employed with or without the locking feature L, as contemplated by the invention. Additionally, any type of connection configuration can be used with the trapped low pressure annular volume feature, all within the scope of the invention.

The above description is illustrative of the preferred embodiment and many modifications may be made by those skilled in the art without departing from the invention whose scope is to be determined from the literal and equivalent scope of the claims below.

We claim:

1. A connection between a pin and a box of adjacent tubulars, comprising:

a pin having an outer surface and configured for insertion into a box having an inner surface, said pin and box respectively comprising an engaging area to allow said pin and box to be torqued together; and a locking surface treatment on one of said inner and outer surfaces that comes into contact with an opposing surface solely by radial expansion of said pin in said box after they are torqued together.

2. The connection of claim 1, wherein:

said surface treatment is disposed on both said inner and outer surfaces so as to contact upon radial expansion of said pin and box.

3. The connection of claim 1, wherein:

said surface treatment comprises parallel ridges.

4. The connection of claim 3, wherein:

said pin and box have a longitudinal axis and said ridges are in substantial alignment with said longitudinal axis.

5. The connection of claim 1, wherein:

said surface treatment comprises a plurality of projections.

6. The connection of claim 5, wherein:

said projections are disposed on both said inner and outer surfaces so as to lockingly engage upon radial expansion of said pin and box.

7. A connection between a pin and a box of adjacent tubulars, comprising:

a pin having an outer surface and configured for insertion into a box having an inner surface, said pin and box respectively comprising an engaging area to allow said pin and box to be torqued together; and a locking surface treatment on one of said inner and outer surfaces that comes into contact with an opposing surface solely by radial expansion of said pin and said box after they are torqued together; and at least one seal protruding from at least one of said inner and outer surfaces and engaging the other of said inner and outer surfaces as said pin and box are made up, whereupon radial expansion of said pin and box.

8. A connection between a pin and a box of adjacent tubulars, comprising:

a pin having an outer surface and configured for insertion into a box having an inner surface, said pin and box respectively comprising an engaging area to allow said pin and box to be torqued together; and a locking surface treatment on one of said inner and outer surfaces that comes into contact with an opposing surface solely by radial expansion of said pin and said box after they are torqued together; and at least two seals protruding from at least one of said inner and outer surfaces and engaging the other of said inner and outer surfaces as said pin and box are made up to define an enclosed annular cavity trapping the ambient pressure upon makeup of said pin and said box, whereupon being subjected to external hydrostatic pressure downhole, said inner surface moves toward said outer surface to move said surface treatment toward a locking engagement of said pin and said box.

9. A connection between a pin and a box of adjacent tubulars, comprising:

a pin having an outer surface and configured for insertion into a box having an inner surface, said pin and box respectively comprising an engaging area to allow said pin and box to be torqued together; and a locking surface treatment on one of said inner and outer surfaces that comes into contact with an opposing surface solely by radial expansion of said pin and said box after they are torqued together; and said surface treatment comprises a diamond pattern.

10. A connection between a pin and a box of adjacent tubulars, comprising:

a pin having an outer surface and configured for insertion into a box having an inner surface, said pin and box respectively comprising an engaging area to allow said pin and box to be torqued together; and a locking surface treatment on one of said inner and outer surfaces that comes into contact with an opposing surface solely by radial expansion of said pin and said box after they are torqued together;

said surface treatment comprises a plurality of projections;

said projections are disposed on both said inner and outer surfaces so as to lockingly engage upon radial expansion of said pin and box; and at least one seal protruding from at least one of said inner and outer surfaces and engaging the other of said inner and outer surfaces as said pin and box are made up, whereupon radial expansion of said pin and box after makeup clearance between said outer and inner surfaces on at least one side of said seal is eliminated.

11. A connection between a pin and a box of adjacent tubulars, comprising:

a pin having an outer surface and configured for insertion into a box having an inner surface, said pin and box respectively comprising an engaging area to allow said pin and box to be torqued together; and a locking surface treatment on one of said inner and outer surfaces that comes into contact with an opposing surface solely by radial expansion of said pin and said box after they are torqued together;

said surface treatment comprises a plurality of projections;

said projections are disposed on both said inner and outer surfaces so as to lockingly engage upon radial expansion of said pin and box; and at least two seals protruding from at least one of said inner and outer surfaces and engaging the other of said inner and outer surfaces as said pin and box are made up to define an enclosed annular cavity trapping the ambient pressure upon makeup of said pin and said box, whereupon being subjected to external hydrostatic pressure downhole, said inner surface moves toward said outer surface to move said surface treatment toward a locking engagement of said pin and said box.

12. A connection between a pin and a box of adjacent tubulars, comprising:

a pin having an outer surface and configured for insertion into a box having an inner surface, said pin and box respectively comprising an engaging area to allow said pin and box to be torqued together;

at least two seals protruding from at least one of said inner and outer surfaces and engaging the other of said inner and outer surfaces as said pin and box are made up to define an enclosed annular cavity trapping the ambient pressure upon makeup of said pin and said box, whereupon being subjected to external hydrostatic pressure downhole after makeup, said inner surface moves against said outer surface create a locking engagement of said pin and said box.

13. The connection of claim 12, wherein:

said pin outer surface and said box inner surface, upon being subject to radial expansion, move into contact with each other in a locking relationship due to at least one of said outer surface and inner surface having a surface treatment to promote said locking.

14. The connection of claim 13, wherein:

said surface treatment comprises a plurality of projections.

15. The connection of claim 14, wherein:

said projections are disposed on both said inner and outer surfaces so as to lockingly engage upon radial expansion of said pin and box.

16. A connection between a pin and a box of adjacent tubulars, comprising:

a pin having an outer surface and configured for insertion into a box having an inner surface, said pin and box respectively comprising an engaging area to allow said pin and box to be torqued together;

at least one seal protruding from at least one of said inner and outer surfaces and engaging the other of said inner and outer surfaces as said pin and box are made up, whereupon radial expansion of said pin and box after makeup, clearance between said outer and inner surfaces on at least one side of said seal is eliminated.

17. The connection of claim 16, wherein:

said pin outer surface and said box inner surface, upon being subject to radial expansion, move into contact with each other in a locking relationship due to at least one of said outer surface and inner surface having a surface, treatment to promote said locking; and said surface treatment comprises a plurality of projections.

18. The connection of claim 17, wherein:

said projections are disposed on both said inner and outer surfaces so as to lockingly engage upon radial expansion of said pin and box.

19. The connection of claim 18, wherein:

said surface treatment comprises parallel ridges.

20. The connection of claim 19, wherein:

said pin and box have a longitudinal axis and said ridges are in substantial alignment with said longitudinal axis.

\* \* \* \* \*